Sept. 29, 1931. C. FRITZ 1,824,882
MEANS FOR MOUNTING THE PROPELLER AND ITS PRIME MOVER ON AN AIRCRAFT
Filed Jan. 14, 1931 2 Sheets-Sheet 1

Inventor
Clifford Fritz
By Clarence A. O'Brien
Attorney

Sept. 29, 1931.　　　　　　C. FRITZ　　　　　　1,824,882
MEANS FOR MOUNTING THE PROPELLER AND ITS PRIME MOVER ON AN AIRCRAFT
Filed Jan. 14, 1931　　2 Sheets-Sheet 2
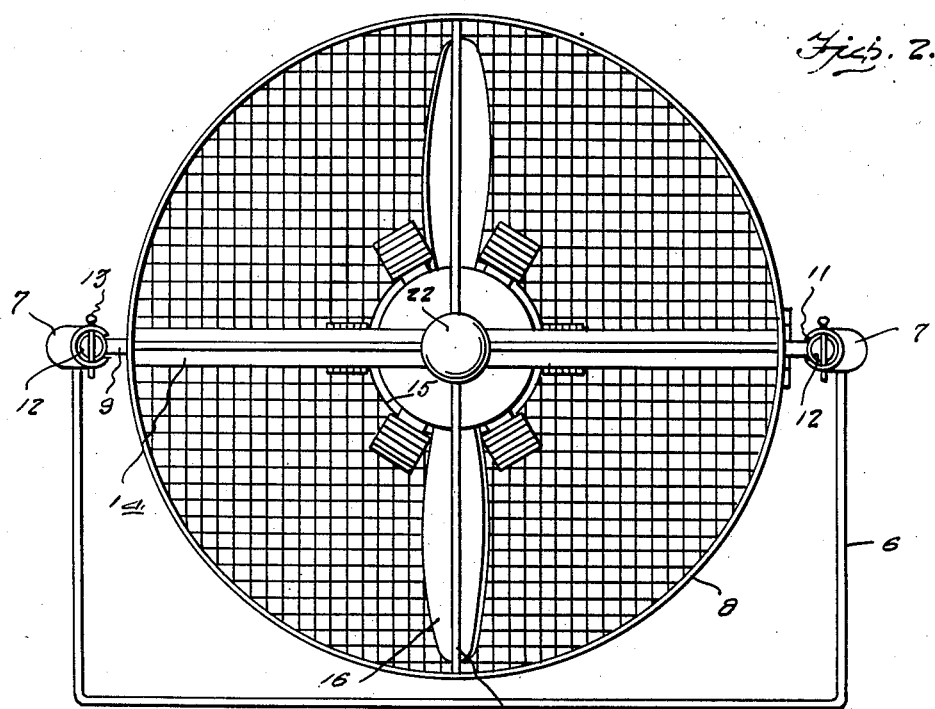
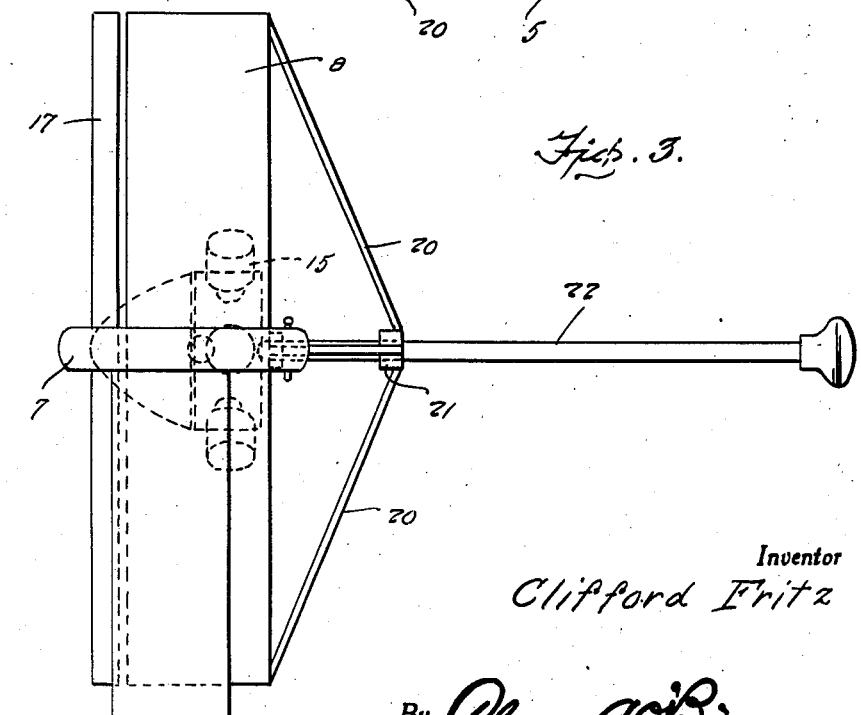
Inventor
Clifford Fritz
By *Clarence A. O'Brien*
Attorney Patented Sept. 29, 1931

1,824,882

UNITED STATES PATENT OFFICE

CLIFFORD FRITZ, OF MILWAUKEE, WISCONSIN

MEANS FOR MOUNTING THE PROPELLER AND ITS PRIME MOVER ON AN AIRCRAFT

Application filed January 14, 1931. Serial No. 508,742.

This invention is particularly applicable to air craft of the heavier than air type, but may be embodied in any craft which is sustained in a fluid medium such as water or air and has for its prime object to provide improved means for steering and controlling movement of a craft.

More particularly, it is an object of the present invention to provide means for mounting a propeller and its prime mover so that the prime mover may be rotated on both a horizontal and vertical axis whereby the propeller and prime mover may be used in the steering and controlling of the craft.

A still further object of the invention is to provide in addition to the above means, means whereby the prime mover may be rotated on either a horizontal or vertical axis by the pilot or operator of the craft.

Other objects and advantages of the invention will become apparent from a study of the following description, taken in connection with the accompanying drawings wherein:

Figure 2 is a rear elevational view thereof.

Figure 3 is a side elevational view thereof.

Figure 1:
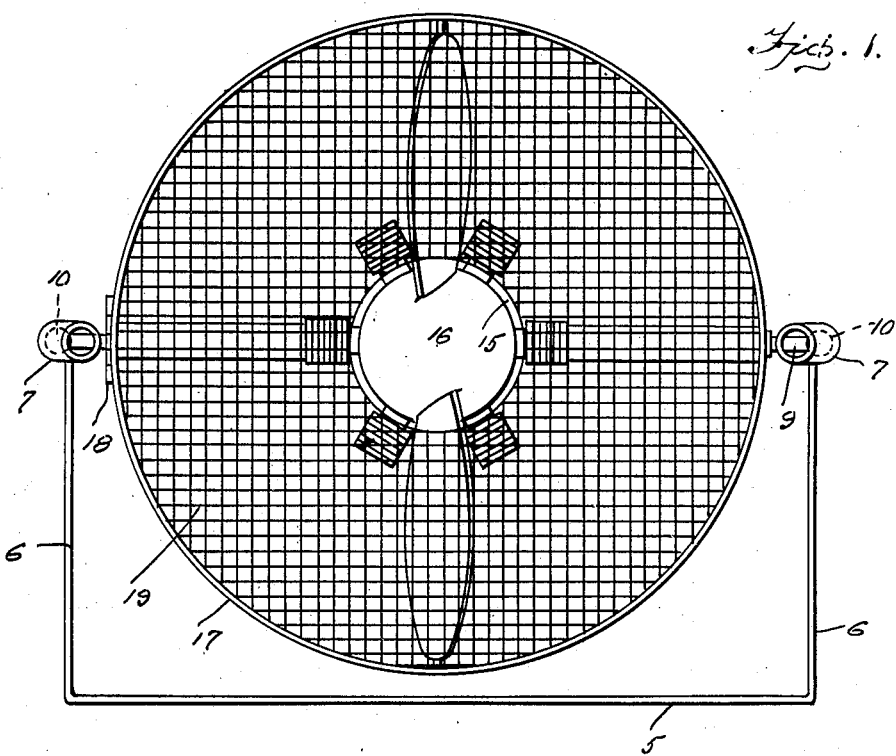
Figure 1 is a front elevational view of the invention.

With reference more in detail to the drawings, it will be seen that the invention comprehends the provision of a substantially U-shaped supporting frame 5, the legs 6 of which have suitably mounted thereon and integral therewith arcuate tubular bearing members 7.

An annular frame 8 has pintles 9 projecting radially from opposite sides thereof and respectively provided with a ball 10 received within a sleeve 7. Sleeves 7 are each provided with a longitudinally extending slot 11 for accommodating the pintles 9. Arranged in the rear end of each sleeve 7 is a relatively short coil spring 12 retained in position through the medium of a suitable pin 13.

Fixedly mounted within the annular frame 8 adjacent the rear end thereof is a cross bar 14 upon which is suitably supported a prime mover, in this instance an internal combustion engine 15. As shown, the prime mover 15 is of a type ordinarily used with air crafts. The propeller driven from the prime mover in the usual manner is designated by the reference character 16. Thus it will be seen that the prime mover 15 and propeller 16 are mounted within the confines of the annular frame 8. At the forward end of the frame 8 is a protector for the propeller. The protector includes an annular frame 17 hinged as at 18 to the frame. Arranged within the frame 17 is a wire mesh fabric 19.

Extending rearwardly from the rear end of the frame 8 is an annular series of circumferentially spaced spokes 20. Spokes 20 at their converging ends merge into a hub 21 that accommodates a rearwardly extending operating rod 22. Rod 22 at its forward end is secured to the cross bar 14 as at 23.

The reticulated guard member is normally retained in a closed position, that is in an operative position with respect to the propeller 16 through the medium of suitable latch means 24.

Figure 4:
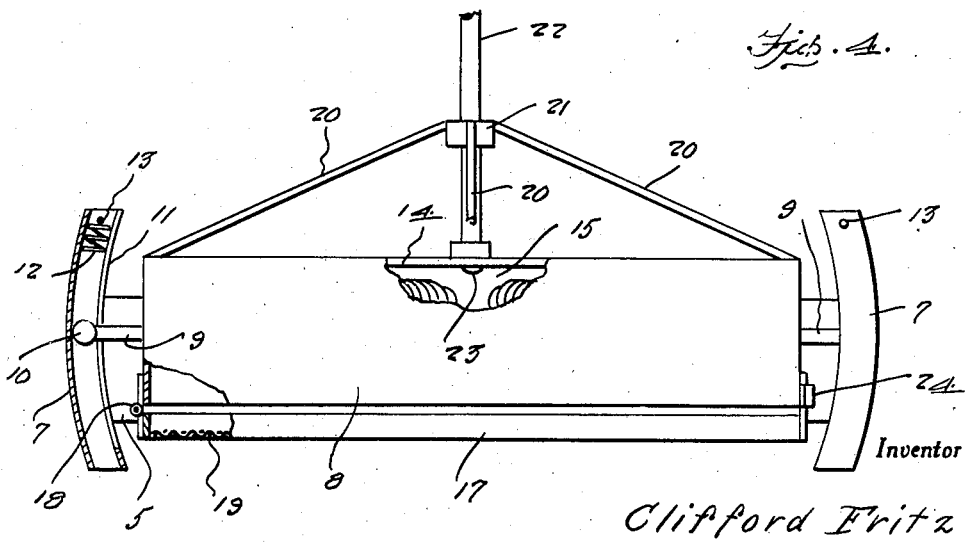
Figure 4 is a top plan view, certain parts being broken away for clearly illustrating the invention.

In actual practice, the frame 5 is suitably supported on the air craft, and by swinging the rod or lever to the right or left in Figure 4, it will be apparent that the frame 8 and associated parts will be swung in a corresponding direction, the sleeves 7 acting as guides for the balls 10 to impart the necessary rotative movement to the frame 8. When manipulated in this manner, the device acts as means for steering the air craft or in the case of a water propelled vehicle as a rudder for steering craft.

When used on an air craft, lever 22 may be raised or lowered for rotating the frame 8 about a horizontal axis, and this positioning of the frame at an angle relative to the perpendicular will be found useful in elevating and lowering the air craft.

Even though I have herein shown and described the preferred embodiment of the invention, it is to be understood that the same is susceptible to changes fully comprehended by the spirit of the invention as herein described, and the scope of the appended claims.

Having thus described my invention, what I claim as new is:

1. In combination a pair of oppositely disposed arcuate sleeves, a frame, pintles projecting from opposite sides of the frame and extending into said sleeves, balls on the ends of the pintles and arranged within the sleeves, means for mounting a prime mover within said frame, and a propeller operatively connected with the prime mover.

2. In combination a pair of oppositely disposed arcuate sleeves, a frame, pintles projecting from opposite sides of the frame and extending into said sleeves, balls on the ends of the pintles and arranged within the sleeves, means for mounting a prime mover within said frame, and a propeller operatively connected with the prime mover, a guard for the propeller normally closing one end of the frame.

3. In combination, a frame, means for mounting the frame for swinging movement on a horizontal and vertical axis respectively, a prime mover mounted in the frame, a propeller driven from said prime mover, a guard for the propeller normally closing one end of the frame, circumferentially spaced spokes projecting laterally from the rear end of the frame, a hub connecting the ends of the spokes remote from the frame, and an actuating rod for the frame having a portion thereof accommodated in said hub.

4. Means for mounting a propeller and its prime mover comprising a pair of spaced oppositely disposed sleeves longitudinally curved, a frame, pintles projecting radially from opposite sides of the frame, balls on the ends of the pintle within said sleeves, yieldable means normally closing one end of the sleeve, means for mounting a prime mover within the confines of said frame, and a propeller driven from said prime mover.

In testimony whereof I affix my signature.

CLIFFORD FRITZ.